Dec. 7, 1943.  R. H. ELHOLM  2,335,924
PICKUP AND LOADING ATTACHMENT FOR CARRIERS
Filed Aug. 21, 1941  3 Sheets-Sheet 1
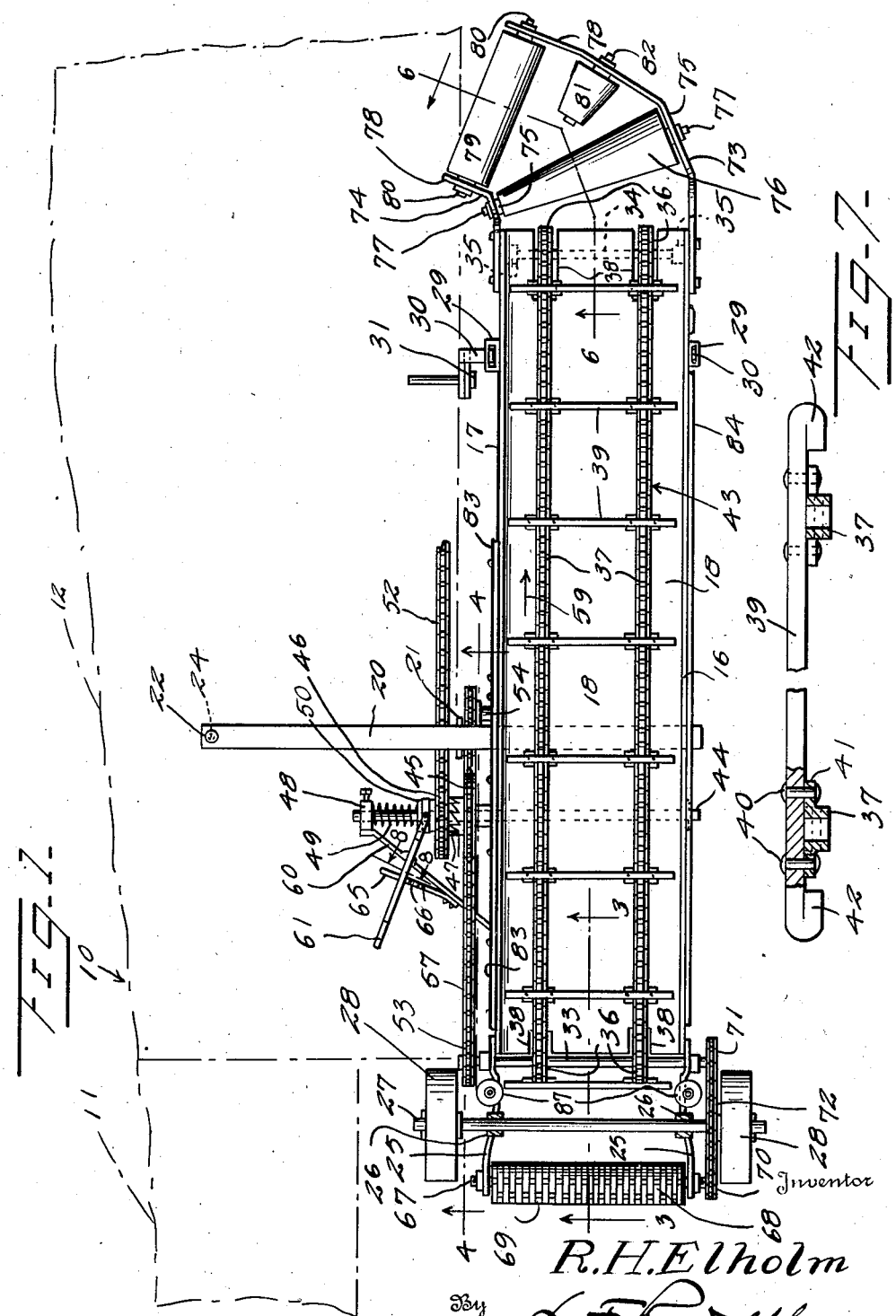

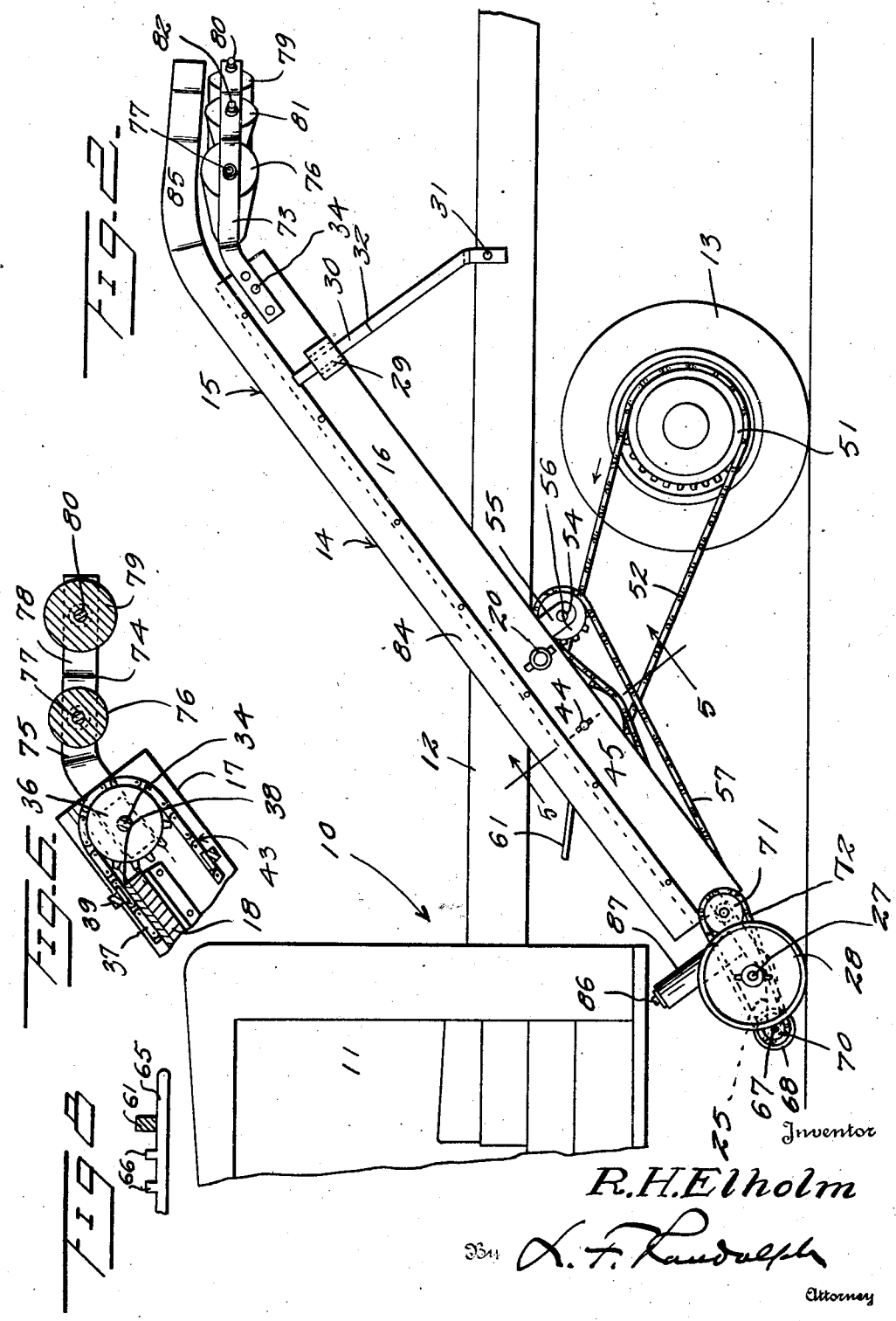

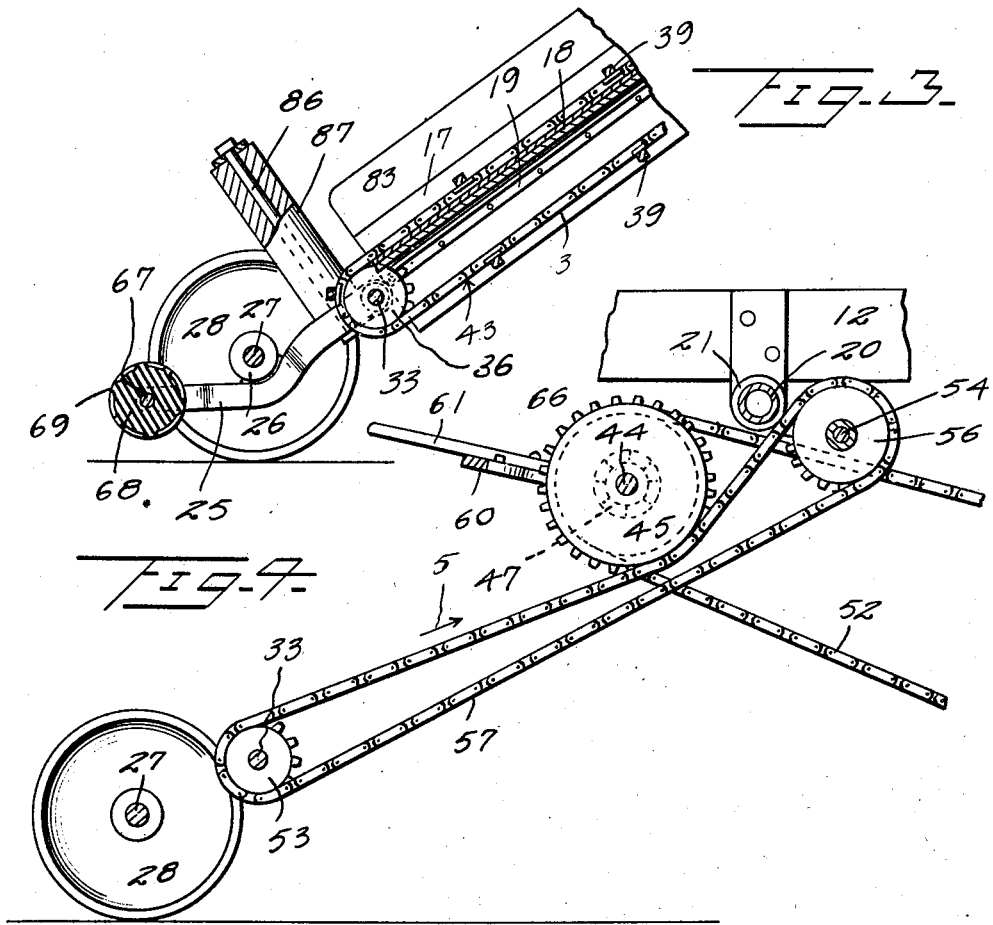
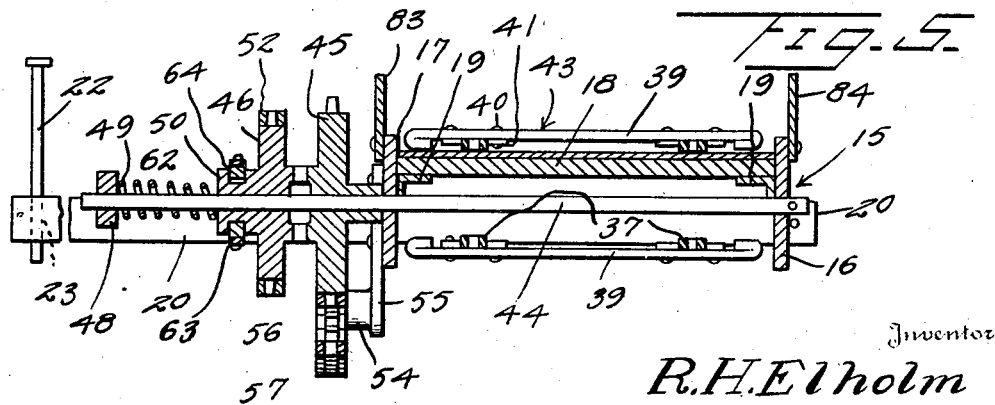

Patented Dec. 7, 1943

2,335,924

UNITED STATES PATENT OFFICE 2,335,924

PICKUP AND LOADING ATTACHMENT FOR CARRIERS

Roy H. Elholm, Gustine, Calif.

Application August 21, 1941, Serial No. 407,806

1 Claim. (Cl. 214—42)

This invention relates to a conveyor which is adapted to be connected to a wheeled carrier such as a motor truck and which is especially adapted for use in loading sacks of grain onto the bed of the truck as the truck is moving in a forward direction.

More particularly, it is an aim of the invention to provide a loader attachment which is adapted to be used for loading sacked grain which is dropped on the ground by a combine to provide a device that will pick up the sacks and convey them to a position where a workman standing on the bed of the truck can readily remove the sacks from the loader and load them onto the truck bed.

Still another aim of the invention is to provide a loader including an endless conveyor adapted to be driven by a ground wheel of the carrier or truck and having clutch means for disengaging the endless conveyor, when desired, and for releasing the endless conveyor while the truck is backing.

Still a further aim of the invention is to provide a pickup and loading device including a conveyor frame which is pivotally and detachably mounted intermediate of its ends on the truck or carrier and at a side thereof and which is supported by means of ground wheels at its forward end so that the frame, which is inclined upwardly and rearwardly, can swing relatively to the truck to permit the ground wheels thereof to ride over uneven portions of the ground.

Still a further aim of the invention is to provide a roller journaled in the forward end of the loader frame and driven off of the endless conveyor to revolve in the opposite direction to said ground wheel, said roller being disposed to initially engage the sacks or other material to be loaded onto the truck and being provided with an anti-friction tread on the periphery thereof for frictionally engaging the sacks or material for drawing them onto the forward end of the loader and for conveying them to the forward end of the endless conveyor.

Still a further aim of the invention is to provide a loader frame which extends beyond the upper, rear end of the endless conveyor and which is turned inwardly, toward the carrier, at its upper end, and said upper end being provided with rollers for receiving and supporting the sacks after they have passed the upper end of the endless conveyor and for directing the sacks inwardly and to a position over the bed of the truck or carrier.

Other objects and advantages of the invention will hereinafter become more fully apparent from the following description of the drawings, which illustrate a preferred embodiment thereof, and wherein:

Figure 1 is a top plan view of the pickup and loading device attached to the side of a carrier, such as a motor truck, shown diagrammatically, Figure 2 is a side elevational view of the same, Figure 3 is an enlarged longitudinal vertical sectional view taken substantially along the plane of the line 3—3 of Figure 1, and with a part of the device shown broken away, Figure 4 is an enlarged longitudinal sectional view of a portion of the loader taken substantially along a plane indicated by the line 4—4 of Figure 1, Figure 5 is an enlarged transverse sectional view of the device taken substantially along a plane indicated by the line 5—5 of Figure 2.

Figure 6 is an enlarged longitudinal sectional view of the upper portion of the device taken substantially along the plane of the line 6—6 of Figure 1, Figure 7 is an enlarged transverse sectional view through a portion of the endless conveyor, and Figure 8 is a detailed sectional view taken on the plane indicated by line 8—8 of Figure 1.

Referring more particularly to the drawings, wherein like reference characters designate like or corresponding parts throughout the different views, 10 designates generally a carrier, such as a conventional motor truck having a cab 11 and a horizontal bed 12 extending rearwardly therefrom. The truck 10 is provided with a plurality of ground wheels, one of which is shown at 13.

The truck 10, and the parts thereof previously described, form no part of the invention but are shown and described merely to illustrate the application of the pickup and loading device, designated generally 14, and comprising the invention. The device 14 includes an elongated frame, designated generally 15 having side rails 16 and 17 which extend the length thereof and which are disposed substantially parallel to one another. A platform 18 is disposed between the sides 16 and 17 and connected thereto by means of angle members 19 which are suitably fastened to the parts. It will be readily apparent that the sides 16 and 17 are held in spaced apart substantially parallel relationship to one another by means of the platform 18 and the members 19.

A rod or pipe 20 has one end thereof turnably mounted in the sides 16 and 17 of the frame 15. The pipe 20 projects from the inner side 17 and is adapted to be disposed transversely of and beneath a portion of the bed 12. As seen in Figure 4, the bed 12 at the side thereof adjacent to which the loading device 14 is disposed is provided with a depending bracket 21 through which the pipe 20 loosely extends. A pin 22 extends through and is removably mounted in a perpendicular bore or opening 23, adjacent the free end of the pipe 20, as seen in Figure 5. As seen in Figure 1, the pin 22 is adapted to extend through an opening 24 in the bed 12 and thence through the opening 23 to detachably connect the free end of the pipe 20 to the underside of the bed 12 to prevent any sliding or swinging movement of the pipe 20 relatively to the bracket 21. When thus disposed, the upper headed end of the pin 22 will engage the upper side of the bed 12. The pipe 20 extends transversely through the conveyor frame 15, intermediate of its ends, and thus provides means for pivotally supporting the frame on the carrier 10 at a side thereof. As seen in Figure 2, the frame 15 is inclined forwardly and downwardly and the sides 16 and 17 at their forward ends, are provided with forwardly projecting arms or bars 25 which are provided, intermediate of their ends, with upwardly projecting members 26 through which extends a shaft 27. Ground wheels 28 are rotatably mounted on the ends of the shaft 27 and said ground wheels are adapted to engage the ground, as seen in Figure 2, for supporting the forward end of the frame 15. Sleeves 29 are attached to the outer sides of the rails 16 and 17, near the upper rear end of the frame 15 to slidably receive the upper ends of bars 30. Bars 30, from near their upper ends, are inclined downwardly and inwardly, toward the bed 12 to which they are fastened as seen at 31 at their lower ends. The upper portions of the bars 30, which are substantially parallel, loosely and slidably engage the sleeves 29 to permit a limited swinging movement of the upper end of the frame 15 relatively to the carrier 10, and from the point 32, as shown in Figure 2, where said bars are bent inwardly, an obstruction is provided to limit the downward sliding movement of the sleeves 29 on the upper portions of the bars 30. Thus, the bars 30 limit the upward swinging movement of the forward end of the frame 15 and the wheels 28, by engagement with the ground, limit its downward swinging movement so that the frame 15 can swing sufficiently relatively to the carrier 10 to ride over uneven portions of the surface over which the carrier 10 is moving.

A shaft 33 extends through and is journaled in the sides 16 and 17, adjacent the lower ends thereof, as seen in Figure 1, and a shaft 34 is journaled in bearings 35 which are attached to the inner faces of the rails 16 and 17, adjacent their upper ends. A pair of sprocket wheels 36 is keyed to each of the shafts 33 and 34, between the rails 16 and 17. The sprocket wheels 36 of each of said shafts are spaced apart from one another with the corresponding sprocket wheels of the two shafts disposed in longitudinal alinement. Chains 37 are trained over said alined complementary sprocket wheels 36 and said chains have their upper parts disposed above the platform 18 and their lower parts disposed thereebeneath, as best seen in Figure 5. The ends of the platform 18 are provided with notches or cutout portions 38 to accommodate the sprocket wheels 36. The chains 37 are connected at spaced points by means of bars 39 which are disposed transversely of the chains and which are connected by means of fastenings 40 to lugs 41 which project laterally from laterally alined links of the two chains 37, as best seen in Figure 7. The ends of the bars 39 are turned downwardly and back upon themselves to form portions 42 which are adapted to engage the platform 18. The bars 39 combine with the chains 37 to form an endless conveyor, designated generally 43, of which the bars 39 form longitudinally spaced slats, for a purpose which will hereinafter be described.

A shaft 44 extends transversely through the frame 15 below the pipe 20 and adjacent thereto and is provided with an inner, free end which extends from the inner rail 17 beneath a portion of the bed 12. A sprocket wheel 45 is turnably mounted on the inner portion of the shaft 44 and adjacent the rail 17. A second sprocket wheel 46 is turnably mounted on the shaft 44, between the sprocket wheel 45 and the free end of said shaft. Sprocket wheels 45 and 46 are provided with interengaging clutch portions 47, of the ratchet type, as best seen in Figure 1, the teeth of which are arranged to mesh so that when the sprocket 46 is turned in a clockwise direction, as seen in Figure 1, it will turn the sprocket 45 in the same direction. A collar 48, which is provided with a set screw, is adjustably connected to the shaft 44, adjacent its inner, free end and forms an abutment for one end of an expansion coil spring 49, the opposite end of which bears against a hub portion 50 for urging the sprocket 46 toward the sprocket 45 to hold the clutch portions 47 in engagement. As seen in Figure 2, a sprocket wheel 51 is connected to the wheel 13 and is actuated thereby. A chain 52 is trained over the sprocket wheels 46 and 51 so that when the vehicle 10 moves forwardly the sprocket 46 will be driven by the sprocket 51 and chain 52 in a counterclockwise direction, as seen in Figure 1 to drive the sprocket 45 in the same direction through the intermeshed clutch portions 47 which are held in engagement with one another by the spring 49. Should the vehicle 10 be backed to turn the sprocket 46 in the opposite or clockwise direction, it will be readily apparent that the teeth of the clutch portion 47 which is attached to the sprocket 46 could ride over the teeth of the clutch portion 47 attached to the sprocket 45 with the spring 49 permitting the sprocket 46 to yield outwardly, for this purpose, so that the sprocket 46 would not drive the sprocket 45 in a clockwise direction.

The end of the shaft 33, which is disposed between the rail 17 and the bed 12 is provided with a sprocket wheel 53 which is keyed thereto. A stub shaft 54 is supported by means of a hanger 55, as best seen in Figure 2, which hanger is secured to and depends from the outer side of the rail 17. A sprocket wheel 56 is turnably mounted on the stub shaft 54 and is disposed in longitudinal alinement with the sprocket wheel 45 and the sprocket wheel 53. A chain 57 is trained over the sprocket wheels 53 and 56 and under the sprocket wheel 45, as best seen in Figure 4. It will be apparent that when the sprocket wheel 45 is driven in a counterclockwise direction, as seen in Figures 1 and 4, by the sprocket wheel 46, as previously explained, that the sprocket wheel 45 will drive the chain 57 in the direction as indicated by the arrow 58, in Figure 4, to turn the sprocket wheels 53 and 56 in a clockwise direction or in the opposite direction to the sprocket wheel 45. This will cause the sprocket wheels 36 which are keyed to the shaft 33 to be turned in the same direction as the sprocket wheel 53 to cause the endless conveyor 43 to move in the direction as indicated by the arrow 59, in Figure 1, so that the upper portion of the endless conveyor 43, which is disposed above the platform 18 will be moving upwardly and rearwardly of the frame 15. The shaft 34 forms an idler shaft and is driven by the chains 37 being trained over its sprocket wheel 36 and consequently will turn in the same direction as the shaft 33.

A diagonal supporting bar 60, as best seen in Figure 1, is fastened at its forward end to the outer side of the rail 17 and at its rear end to the collar 48 and is disposed obliquely to the longitudinal axis of the frame 15. A lever 61 is pivotally mounted intermediate of its ends on the supporting bar 60, intermediate of the ends thereof. As seen in Figure 5, the hub portion 50 of the sprocket wheel 46 is provided with an annular groove 62 and the lever 61 is provided with a forked end 63 the prongs of which are provided with inwardly projecting lugs 64 at their free ends which loosely engage the groove 62 to permit the hub 50 to revolve relatively thereto. It will thus be readily apparent that the opposite, handle end of the lever 61 can be swung toward the frame 15 for moving the sprocket wheel 46, against the action of the spring 49, away from the sprocket wheel 45 to disengage the clutch portions 47 so that the endless conveyor 43 will not be driven although the carrier 10 is moving in a forward direction. As seen in Figure 1, a latch bar 65 is attached at one of its ends to the forward side of the supporting bar 60 and near the forward end thereof. The latch bar 65 projects obliquely to the bar 60 and is disposed beneath and in engagement with the lever 61 between its pivot and handle end. Latch bar 65 is provided with two upwardly extending projections 66 between which the lever 61 is adapted to be positioned for holding the sprocket wheel 46 in a retracted position, away from the sprocket wheel 45 so that the clutch portions 47 will be disengaged.

A shaft 67 is journaled near its free end in the forward, free ends of the arms 25 and forwardly of the shaft 27. A roller 68 is keyed to the shaft 67 and is disposed between the arms 25 and extends substantially the width of the frame 15. The roller 68 is preferably formed of rubber and its periphery is provided with annular grooves and notches and projections therein which combine to form an anti-skid tread 69, for a purpose which will hereinafter be explained. The outer end of the shaft 67, which is disposed on the outer side of the outer arm 25, has a sprocket wheel 70 keyed thereto and the outer end of the shaft 33 is provided with a sprocket wheel 71. A chain 72 is trained over the sprocket wheels 70 and 71 so that the shaft 67 will be driven by the shaft 33 and in the same direction as said last mentioned shaft to cause the roller 68 to be revolved in the opposite direction to the wheels 28 when the carrier 10 is moving forwardly and when the endless conveyor 43 is in operation.

An arm 73 is attached to the upper rear end of the outer rail 16 and projects rearwardly and inwardly therefrom and an arm 74 is attached similarly to the upper end of the inner rail 17 and projects rearwardly and inwardly therefrom. The arm 73 is substantially longer than the arm 74 and said arms are provided with substantially parallel portions 75, as best seen in Figure 1. A cone shaped roller 76 is provided with a shaft 77 which extends therethrough and projects from the ends thereof and has the ends thereof journaled in the portions 75. The cone shaped roller 76 tapers from its outer end, or from the end thereof adjacent to the arm 73 to its inner end. The arms 73 and 74 are also provided with substantially parallel free end portions 78 between which is disposed a roller 79 having a shaft 80 which projects from the ends thereof and which is journaled in the portions 78. The rollers 76 and 79 combine to form an outwardly diverging opening therebetween in which is disposed a short cone shaped roller 81 having a shaft 82 which extends therethrough and which is journaled in the intermediate portion of the member 73. Roller 81 tapers in the same direction as the roller 76.

An elongated plate 83 is suitably fastened to the outer side of the rail 17 and projects substantially above the upper edge thereof. As seen in Figure 1, the plate 83 extends from adjacent the lower end of the rail 17 to a point near its upper end and to a point which is above the level of the bed 12. An elongated plate 84 is attached to the outer side of the rail 16 and similarly projects substantially above the upper edge therof and extends from adjacent the lower, forward end of the rail 16 to beyond the upper rear end thereof, as best seen in Figure 2. The rear, free end portion 85 of the plate 84 is curved inwardly similarly to the arm 73 above which it is disposed.

As best seen in Figures 1 and 3, a rod or bolt 86 is fastened to and projects upwardly from each of the arms 25, between the shafts 27 and 33. The rods or bolts 86 are disposed substantially at right angles to the portions of the arms 25 to which they are connected. A roller 87 is turnably mounted on each of the rods or bolts 86.

Assuming that the pickup and loading device 14 is mounted, as heretofore described, and that the clutch portions 47 are in engagement, as seen in Figure 1, and that the carrier 10 is moving forwardly, it will be obvious that the endless conveyor 43 will be moving in the direction as indicated by the arrow 59, and that the roller 68 will be turning in a clockwise direction, as seen in Figures 1 and 3. The roller 68, as seen in Figures 2 and 3, is disposed adjacent to the surface over which the carrier 10 and the wheels 28 are moving. The pickup and loading device 14 is adapted especially for picking up and loading sacked grain, not shown, onto the bed 12, and it will be apparent that if said sacks are disposed in the path of the loader 14 that they will be engaged initially by the roller 68 which, due to the direction in which it is turning, and to its anti-skid tread 69, will frictionally engage the sacks and pull them upwardly and onto said roller and to push them upwardly and onto the lower end of the endless conveyor 43 where the slats 39 will engage the sacks and convey them upwardly over the platform 18 where they can be removed from the endless conveyor by workmen standing on the bed 12 and stacked or loaded onto the bed 12. If the sacks are not thus removed from the endless conveyor 43 they will be directed thereby onto the rollers 76, 79 and 81 over which they will be pushed by following sacks and thus caused to drop onto the bed 12. The plates 83 and 84 form supplementary guard rails to prevent the sacks from dropping off of the sides of the frame 15 and the rail portion 85 effectively prevents the sacks from being forced off of the outer ends of the rollers 76, 79 and 81 and guides the sacks inwardly and toward the bed 12. The rollers 87 are adapted to be engaged by the sacks as they move between the roller 68 and the endless conveyor 43, should the sacks be off center for guiding the sacks to correctly position them on the endless conveyor. As previously explained, it will be obvious that the forward, lower end of the frame 15 has a limited upward swinging movement to permit the wheels 28 to ride over obstructions or uneven surfaces, and it will furthermore be obvious that the lever 61 can be latched to hold the clutch portions 47 in a released position so that the endless conveyor 43 and roller 68 will not be driven.

The pickup and loading device 14 can be readily demounted from the carrier 10 by disconnecting the bars 30 from the sleeves 29 and removing the pin 22 and chain 52 so that the loader 14 can be moved laterally away from the carrier 10 to slide the pipe 20 outwardly through the bracket 21 for disengaging it therefrom to thereby disengage the loading device 14 from the carrier 10.

Various modifications and changes are contemplated and may obviously be resorted to as only a preferred embodiment of the invention has been disclosed.

I claim as my invention:

A sack pickup comprising a portable conveyor frame adapted to be attached to a side of a wheeled carrier and supported thereby, said frame being inclined upwardly and rearwardly from its forward end to its rear end, an endless conveyor mounted in said frame and disposed lengthwise thereof, said endless conveyor being adapted to be driven from a ground wheel of the carrier so that the upper flight of the endless conveyor will be moving upwardly and rearwardly relatively to the frame, the forward end of said frame and endless conveyor being disposed adjacent the ground and adapted to receive sacks of material to be loaded onto the carrier, as the carrier is moved forwardly, for conveying the sacked material upwardly and rearwardly and to a position where it can be loaded onto the carrier, a roller journaled in the forward, lower end of the frame and disposed transversely thereof, means for driving said roller in a direction to cause the roller to engage and feed the sacks of material upwardly and onto the frame, said roller having a periphery formed of rubber and provided with a gripping tread for frictionally engaging the sacks of material.

ROY H. ELHOLM.